United States Patent [19]

Reitz

[11] Patent Number: 4,793,747
[45] Date of Patent: Dec. 27, 1988

[54] STAIR RAIL SPINDLE JIG

[76] Inventor: George J. Reitz, 121 Village Dr., Feasterville, Pa. 19047

[21] Appl. No.: 182,381

[22] Filed: Apr. 18, 1988

[51] Int. Cl.$^4$ .............................................. B23B 47/28
[52] U.S. Cl. .............................. 408/115 R; 408/72 R; 408/97
[58] Field of Search ...................... 408/72 R, 72 B, 77, 408/87, 88, 89, 97, 98, 103, 110, 111, 115 R, 115 B; 33/197, 636, 637, 638, 640, 641, 642, 628

[56] References Cited

U.S. PATENT DOCUMENTS

| | | |
|---|---|---|
| 1,510,219 | 9/1924 | Harding . |
| 1,856,485 | 5/1932 | Kirkbride .............................. 408/97 |
| 1,987,773 | 1/1935 | Eppenstein ............................ 33/185 |
| 2,029,650 | 2/1936 | Betz . |
| 2,273,954 | 2/1942 | Grass . |
| 2,423,164 | 7/1947 | Williams . |
| 2,455,871 | 12/1948 | Meyer . |
| 2,548,197 | 4/1951 | Conner ................................. 33/174 |
| 2,903,920 | 9/1959 | Blecha . |
| 3,082,651 | 3/1963 | Patrick, Jr. . |
| 3,465,620 | 9/1969 | Hilburn ........................... 408/115 R |
| 3,626,513 | 12/1971 | Pytlak ................................... 408/97 |
| 4,253,784 | 3/1981 | Anderson ........................ 408/115 R |
| 4,492,498 | 1/1985 | Kaufman ........................ 408/115 R |
| 4,497,325 | 2/1985 | Wedel ............................ 408/115 R |
| 4,538,354 | 9/1985 | Smolik ............................. 408/72 B |

Primary Examiner—Gil Weidenfeld
Assistant Examiner—Daniel W. Howell
Attorney, Agent, or Firm—Kenneth P. Synnestvedt

[57] ABSTRACT

Spindle jig mechanism for use in drilling spindle apertures in stair rails, the mechanism including a mounting block adapted to extend along the underside of a stair rail and having a transversely extending cylindrical cavity for receiving a cylindrical support for a tubular guide for a drill to be employed with the jig mechanism. Provision is made for multiple jig mechanisms having a plurality of mounting blocks, each adapted to position different tubular drill guides adapted to cooperate with drills of different sizes.

12 Claims, 3 Drawing Sheets

STAIR RAIL SPINDLE JIG

BACKGROUND AND STATEMENT OF OBJECTS

It is typical in the construction of stairways to provide a stair rail or banister at at least one side of the stairway. Such stair rails are commonly positioned above at least one edge of the stairway at an inclined angle, the rail usually being supported by a plurality of rail spindles extended upwardly from the end portions of the stairs to the stair rail.

Most commonly, two stair rail spindles are provided for supporting the rail overlying the end of each stair. In some instances, three (or even four) spindles are provided for supporting the rail over each stair.

Various parts of the stairway, including the rails, are commonly made of wood and the present invention provides a stair rail spindle jig for use in drilling spindle apertures in the underside of the rail. The jig comprises a mounting block having a planar surface adapted to extend along and parallel to the underside surface of the stair rail.

According to the invention, provision is made for simplifying the operation of drilling the spindle-receiving apertures in the underside of the stair rail.

It is contemplated according to the invention that the jig mechanism be arranged to accommodate drilling of the spindle-receiving apertures in the stair rail at any desired inclined angle and also at any desired spacing along the stair rail.

In many instances, stair rail spindles are tapered, being of reduced diameter at the upper ends, and the same or similar spindles are used in each position above each step of the stairway; and since the rail is inclined at an angle to the stair and since the spindles are tapered, provision is made according to the invention for drilling individual apertures for the stair rails associated with a given stair of different diameters in order to accommodate the difference in diameters of the spindle at the point of junction of the spindle with the rail.

The foregoing and other complexities encountered in the fabrication of stairways, especially inclined stair rails has commonly resulted in complexities in the installation work particulary in connection with the drilling of holes in the rails of appropriate size and inclination. It is a major objective of the present invention to provide means for simplifying the complexities commonly encountered in this work.

BRIEF DESCRIPTION OF THE DRAWINGS

How the foregoing and other objects and advantages are attained will appear more fully from the following description of the drawings, in which:

FIG. 1a is a fragmentary enlarged view of a portion of FIG. 1, illustrating certain details used in the arrangement of the invention

DETAILED DESCRIPTION OF THE DRAWINGS

Figure 1:
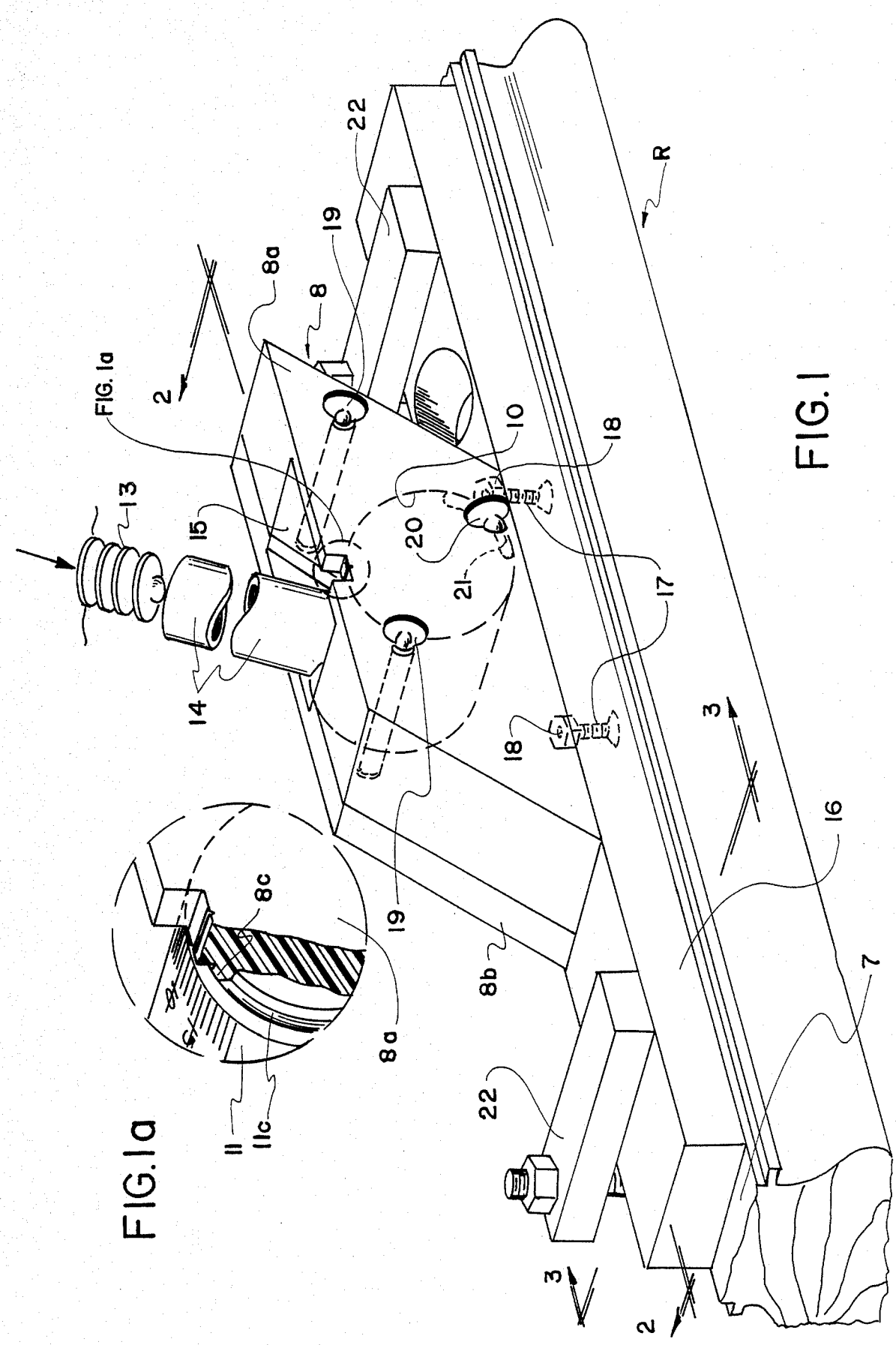
FIG. 1 is an isometric view illustrating a typical stair rail in inverted position at the bottom of the view, and having stair rail jig mechanism according to the present invention associated therewith.

In the drawings, toward the bottom of each figure, a piece of a stair rail is generally indicated at R, the rail being positioned with the rounded top surface presented downwardly and with a flat underside surface 7 presented upwardly, as clearly appears in FIG. 1. The spindles to be associated with the handrail are customarily connected with the handrail by drilling apertures in the underside surface of the handrail and inserting and affixing the ends of the spindles into those apertures.

As above indicated, the present invention is concerned with drilling jig equipment for use in simplifying the accurate drilling of the desired apertures for the spindles, the equipment of the invention being adapted to be employed in the drilling of apertures of different sizes adapted to cooperate with upper end portions of spindles of different sizes, as will be explained more fully hereinafter.

However, reference is first made to the general arrangement of the jig mechanism; and from the drawings, it will be seen that the jig mechanism comprises a mounting block indicated generally by the numeral 8. The mounting block may be formed of various materials, for instance, may be molded from various plastic materials. This mounting block has a planar surface 9 at the bottom or underside of the block extended along and parallel to the underside surface 7 of the stair rail. The mounting block has a cylindrical cavity 10 formed therein which is spaced from said planar surface of the mounting block. The cylindrical cavity has its axis extended in a plane parallel to the plane of said surface but transversely of the length of said planar surface. The cylindrical cavity 10 is adapted to receive the cylindrical support 11 which is provided with a transverse aperture 12 for receiving a drill 13 and a tubular drill guide 14 to be employed in drilling spindle-receiving apertures in the underside surface 7 of the stair rail.

This mounting arrangement for the drill and its enclosing tubular drill guide provides for angular adjustment movement of the drill and guide about the axis of the cylindrical cavity 10 and the cylindrical support 11.

For the purpose of simplicity in manufacture of the parts of the mounting block, the block is preferably made up of two pieces, on of which is indicated at 8a, and the other of which is indicated at 8b in FIG. 1. The cylindrical cavity 10 is desirably formed within the block 8a, and the block 8b, in effect, comprises an end closure plate for the cavity 10 and the block assembly.

The cylindrical support 11 and one or both of the block parts 8a and 8b may be provided with interengaging tongue-and-groove parts at the ends of the cylindrical support in order to provide for guided relative turning of the support. Such an arrangement is fragmentarily shown at 11c and 8c in FIG. 1a.

As will be seen from various of the figures, the tubular drill guide 14 extends upwardly out of the cylindrical support 11 and out of the mounting block 8, the upper central portion of the block being provided with an upwardly open cavity 15 in order to accommodate the tubular drill guide when angular adjustment movements are made by turning the cylindrical support 11 in the cavity 10.

Preferably, a replaceable or renewable wood strip 16 is interpositioned between the planar surface 9 at the underside of the drill mounting block and the underside surface 7 of the stair rail, this rail being positioned with the underside surface presented upwardly as is shown in the various figures in order to simplify the drilling work.

The use of the renewable wood strip 16 between the stair rail and the mounting block during the drilling operation is desirable from a number of standpoints, and especially from the standpoint of providing a disposable and renewable piece for receiving the initial surface drilling effect when a hole is being made, thereby avoiding the irregularities which commonly occur as a result of penetration of the drill through a wood surface, particularly when the angle of penetration is obliquely inclined as is customary in the drilling of spindle holes in a stair rail. Such a renewable and replaceable wood strip can readily be employed for repeated drilling operations and then discarded and replaced with another such strip.

The strip 16 is advantageously temporarily fastened to the lower side of the mounting block, as by means of screws 17, the heads of which are countersunk in the lower surface of the renewable wood strip 16 and the upper ends of which are threaded into nuts 18 which may be permanently fixed in the block close to the lower side surface thereof.

Figure 2:
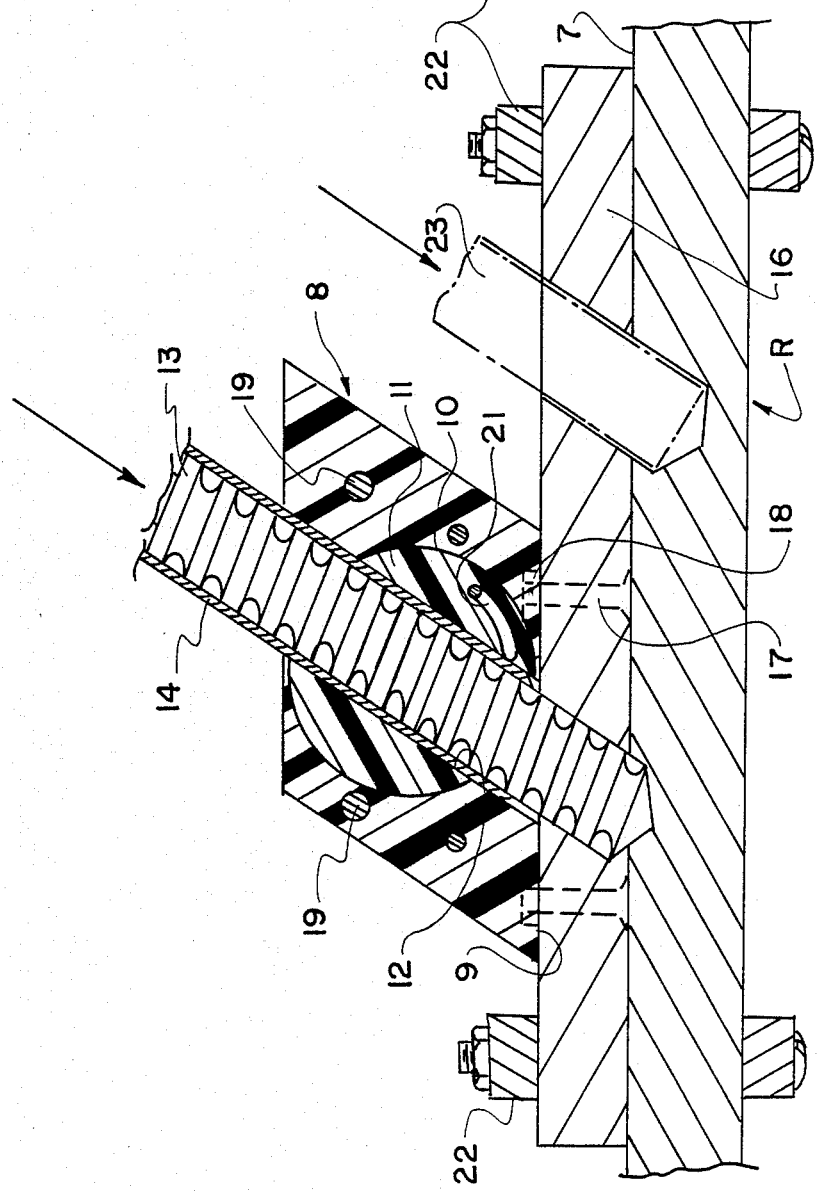
FIG. 2 is a vertical longitudinal sectional view through the stair rail and associated rail spindle jig parts provided according to the present invention, this view being taken as indicated by the line 2—2 on FIG. 1.

The lower end of the tubular drill guide 14 is advantageously tapered or flared, as clearly shown in FIG. 2, so that the drill guide may be brought close to the upper surface of the renewable wood strip 16 and may also have freedom for relative adjustment movement by angularly rotating the drill guide supporting cylinder 11 in the cylindrical cavity 10 of the mounting block.

The clearance or cut-away indicated at 15 in FIG. 1 in the upper portion of the mounting block provides freedom for the angular adjustment movement of the drill guide just referred to. The two portions 8a and 8b of the mounting block are desirably clamped together by means of thumb screws 19,19. The angular position of the cylindrical support 11 in the cylindrical cavity 10 may be secured by employment of a thumb screw 20 extended through an arcuate passage 21 in the cylindrical support 11. All three of the wing nuts 19, 19 and 20 should be loosened when making angular adjustments of the cylindrical support 11 and the drill.

Figure 3:
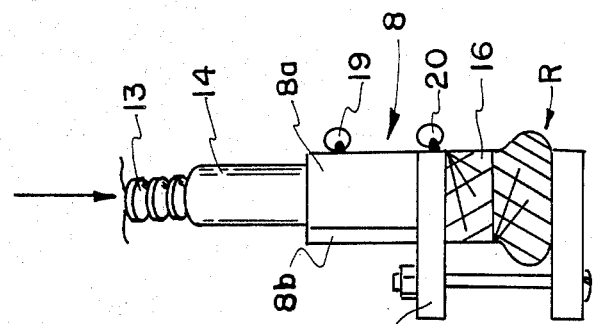
FIG. 3 is a transverse sectional view taken substantially as indicated by the line 3—3 applied to FIG. 1.

The relative positions of the mounting block 8, the renewable wood strip 16 and the stair rail R may be established and maintained in various different ways. For example, a clamp, such as indicated at 22, see particularly FIGS. 2 and 3, may be employed to secure the renewable strip 16 and the stair rail together to provide for desired positioning when drilling a spindle aperture in the rail. After an aperture has been drilled through the renewable wood strip 16 and into the stair rail, as appears toward the right-hand side of FIG. 2, a dowel pin 23 may be temporarily inserted in order to stabilize and maintain the desired interpositioning of the renewable strip 16 and the rail. The illustration toward the right of FIG. 2 represents a situation where apertures had already been drilled through the renewable strip 16 and the rail, as indicated toward the right of FIG. 2; and in FIG. 2, another hole is in the process of being drilled by the drill 13 operating through the tubular guide 14. In the left-hand portion of FIG. 2, the hole in the rail has not yet been completed by the drill, but with further activity, the hole will be produced as a duplicate of the hole toward the right-hand end o FIG. 2.

At this point, it is also to be noted that the same equipment as described above can be employed with drills of smaller diameter; but in the event of employment of a drill of smaller diameter than that indicated at 13 in FIG. 2, the drill guide 14 will be proportioned to fit the smaller diameter drill, in order to provide accuracy in the support and guiding of the drill in producing the additional aperture. In any event, the outside diameter of the drill guide 14 should always be the same in order to provide for appropriate guiding of the drill in the transverse cavity of the cylindrical support 11.

Figure 4:
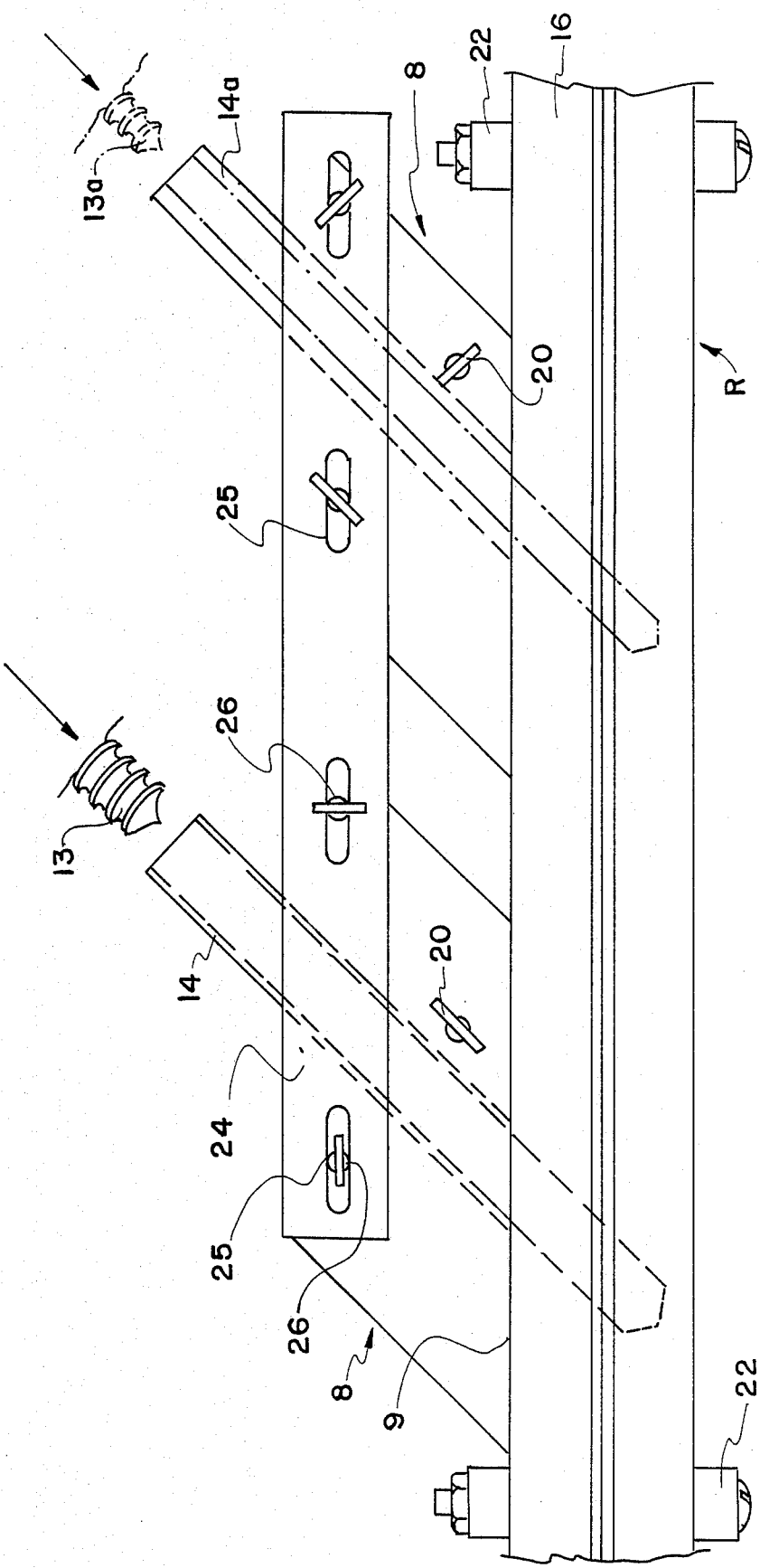
FIG. 4 is a side elevational view of an assembly of two stair rail jig mechanisms provided according to the invention and mounted for relative adjustment movement lengthwise of the stair rail which appears at the bottom of the figure.

An illustration of the use of a drill of smaller size is included in the embodiment as shown in FIG. 4 which further shows another feature employable in accordance with the present invention.

Thus, in FIG. 4, two mounting blocks 8 are provided and positioned in spaced relation axially of the renewable wood strip 16 and of the rail R. These two mounting blocks, each being generally indicated by the numeral 8 in FIG. 4, are positioned and interspaced by means of at least one side guide 24 which extends throughout the length of the mounting block assembly. The side guide 24 conveniently takes the form of a steel strip having elongated apertures 25 through which thumb screws 26 may be extended. These screws may be employed to secure the mounting blocks in the desired relative positions lengthwise of the stair rail, as will be readily understood from FIG. 4.

Toward the left of FIG. 4 is an illustration of a drill 13 and a drill guide 14 of th same proportions as those illustrated in section in FIG. 2. The drill guide 14a associated with the right-hand mounting block in FIG. 14 is adapted to be employed with a drill 13a of smaller diameter than the drill 13; and for this purpose, the inside diameter of the drill guide 14a for the drill 13a will, of course, also be of smaller diameter.

By the employment of various of the adjustable features above described, drills of different sizes may be utilized at different points longitudinally of the stair rail, according to the needs for any particular stair rail installation.

In connection with the use of the replaceable wood strip 16, it is mentioned that several stair rail apertures may be drilled through the same hole made in the replaceable wood strip. Moreover, in the event of the drilling of one hole through the replaceable wood strip of a relatively small diameter, that same hole may subsequently be used either for the drilling of a hole of the same diameter in the stair rail, or may be used for the drilling of a spindle-receiving hole of larger diameter into the stair rail. It will thus be seen that the employment of the replaceable wood strip provides considerable flexibility in the actual drilling operations.

By virtue of the flexibility provided by the spindle jig mechanism of the present invention, various different conditions may be met. For instance, in many instances where two or more spindles of the same general construction are employed to support the rail of a given step of the stairway (the rail being at an inclined angle), if the spindles being employed are of tapered construction, as is frequently the case, the upper end portions of the two spindles over a given step of the stairway will be of different diameter; and it is, therefore, preferred that the holes drilled for those two spindles should be of different diameter in order to snugly engage or fit upper ends of the spindles.

In addition to the illustration of the tongue-and-groove guiding parts 8c and 11c, FIG. 1a also fragmentarily illustrates index markings on the mounting block and on the cylindrical support in order to provide a means for reading the relative angle of adjustment. In this way, adjustments of the angle of the drill and the apertures being drilled may be accurately repeated.

Various different sequences in the operations and adjustments, particularly where a plurality of mounting blocks are provided, as in FIG. 4, may be employed in order to accommodate a wide variety of conditions encountered in the drilling of appropriate apertures for stairways of a variety of kinds

I claim:

1. A stair rail spindle jig for use in drilling spindle apertures in stair rails, said jig comprising a mounting block having a planar surface adapted to extend along and parallel to the underside surface of a stair rail, the mounting block having a cylindrical cavity spaced from said surface of the block and having its axis extended in a plane parallel to the plane of said surface but transversely of the length of said surface, a tubular guide for a drill for drilling spindle-receiving apertures in a stair rail, a cylindrical support for said tubular guide, said cylindrical support being proportioned to fit coaxially within said cylindrical cavity of the mounting block and having an aperture extended transversely and diametrically through the cylindrical support for receiving the end of the tubular guide presented toward said planar surface of the mounting block, the cylindrical cavity in the mounting block having open regions toward opposite sides of the block for accommodating angular adjustment movements of the tubular drill guide with respect to the block, and releasable fastening means for securing the cylindrical support in said cylindrical cavity in different relative positions and thereby provide for alternatively fastening the tubular guide in different angular positions with respect to said surface of the mounting block.

2. A stair rail spindle jig as defined in claim 1 adapted for use with at least two drills of different sizes, and further including two tubular guides respectively usable with said drills, said tubular guides having the same outside diameter adapted to fit in the aperture extended through the cylindrical support, and respectively having inside dimensions to fit said drills of different sizes.

3. A stair rail spindle jig as defined in claim 1 and further in which two mounting blocks and associated parts as defined in claim 1 are provided, each block having a surface adapted to extend along and parallel to the underside surface of a stair rail, the blocks being adapted to be positioned in spaced end-to-end relation along and parallel to the underside surface of a stair rail, and mechanism interconnecting the blocks including adjustable means providing for relative shifting movement of the blocks toward and away from each other.

4. A stair rail spindle jig as defined in claim 1 and further including indicia markings on the mounting block and on the cylindrical support indicating the relative angular positions of the tubular drill guide and the surface of the mounting block adapted to extend along and parallel to the underside of the stair rail.

5. A stair rail spindle jig as defined in claim 1 in which the and of the tubular guide presented toward said planar surface of the mounting block is configured with tapered end portions accommodating relative angular adjustment movements of the drill guide in the region of the planar surface of the mounting block adapted to extend along the underside surface of a stair rail.

6. A stair rail spindle jig as defined in claim 1 in which the mounting block is formed of two pieces lying at opposite sides of a plane of split positioned perpendicularly to the axis of the cylindrical cavity of the mounting block.

7. A stair rail spindle jig as defined in claim 6 in which the plane of split of the mounting block is located adjacent to one end of the cylindrical cavity.

8. A stair rail spindle jig for use in drilling spindle apertures in stair rails, said jig comprising first and second mounting blocks, each having a planar surface adapted to extend along and parallel to the underside surface of a stair rail, said mounting blocks being spaced from each other in a direction longitudinally of said planar surfaces, mechanism for interconnecting said blocks including adjustable means for interspacing said blocks at different distances from each other, each mounting block having a cylindrical cavity spaced from said surface of the block and having its axis extended in a plane parallel to the plane of said surface but transversely of the length of said surface, a tubular guide for a drill for drilling spindle-receiving apertures in a stair rail, each of said blocks having a cylindrical support adapted to provide support for said tubular guide, each cylindrical support being proportioned to fit coaxially within the cylindrical cavity of the associated mounting block and having an aperture extended transversely and diametrically through the cylindrical support for receiving the end of the tubular guide presented toward said planar surface of the mounting block, the cylindrical cavity in each mounting block having open regions toward opposite sides of the block for accommodating angular adjustment movements of the tubular drill guide with respect to the block, and separate releasable fastening means for each block for securing the cylindrical support in its cylindrical cavity in different relative positions and thereby provide for alternatively fastening the tubular guide in different angular positions with respect to said surface of the mounting block.

9. A stair rail spindle jig for use in drilling spindle apertures in stair rails, said jig comprising first and second mounting blocks, each having a planar surface adapted to extend along and parallel to the underside surface of a stair rail, said mounting blocks being spaced from each other in a direction longitudinally of said planar surfaces, mechanism for interconnecting said blocks including adjustable means for interspacing said blocks at different distances from each other, each mounting block having a cylindrical cavity spaced from said surface of the block and having its axis extended in a plane parallel to the plane of said surface but transversely of the length of said surface, tubular guides for drills for drilling spindle-receiving apertures in a stair rail, the tubular drill guides having the same outside dimensions, but having different inside dimensions to fit drills of different sizes, each of said blocks having a cylindrical support adapted to provide support for a tubular guide, each cylindrical support being proportioned to fit coaxially within the cylindrical cavity of the associated mounting block and having a transversely extended aperture for receiving the end of the tubular drill guide received therein and presented toward said planar surface of the mounting block, the cylindrical cavity in each mounting block having open regions toward opposite sides of the block for accommodating angular adjustment movements of the tubular drill guide with respect to the block, and separate releasable fastening means for each block for securing the cylindrical support in its cylindrical cavity in different relative positions and thereby provide for alternatively fastening the tubular drill guide in different angular positions with respect to said surface of the mounting block.

10. Stair rail spindle jig mechanism for use in drilling spindle apertures alternatively with at least two drills of different sizes, said jig mechanism comprising a mounting block having a planar surface adapted to extend along and parallel to the underside surface of a stair rail, the mounting block having a cylindrical cavity spaced from said surface of the block and having its axis extended in a plane parallel to the plane of said surface but transversely of the length of said surface, tubular guides for alternative use with said drills of different sizes and providing for drilling of spindle-receiving apertures of different sizes in a stair rail, a cylindrical support being proportioned to fit coaxially within said cylindrical cavity of the mounting block and having a transversely extended aperture for receiving the end of the tubular guide and presented toward said planar surface of the mounting block, the cylindrical cavity in the mounting block having open regions toward opposite sides of the block for accommodating angular adjustment movements of the tubular drill guide being used with respect to the block, and releasable fastening means for securing the cylindrical support in said cylindrical cavity in different relative positions and thereby provide for alternatively fastening the tubular guide being used in different angular positions with respect to said surface of the mounting block.

11. A stair rail spindle jig for use in drilling spindle apertures in stair rails, said jig comprising a mounting block having a planar surface adapted to extend along and parallel to the underside surface of a stair rail, a replaceable wood strip adapted to be assembled in a position between said mounting block and said surface of the stair rail, separable fastening means for interconnecting said strip and the mounting block, the mounting block having a cylindrical cavity spaced from said surface of the block and having its axis extended in a plane parallel to the plane of said surface but transversely of the length of said surface, a tubular guide for a drill for drilling spindle-receiving apertures in a stair rail, a cylindrical support for said tubular guide, said cylindrical support being proportioned to fit coaxially within said cylindrical cavity of the mounting bloc and having an aperture extended transversely and diametrically through the cylindrical support for receiving the end of the tubular guide presented toward said planar surface of the mounting block, the cylindrical cavity in the mounting block having open regions toward opposite sides of the block for accommodating angular adjustment movements of the tubular drill guide with respect to the block, and releasable fastening means for securing the cylindrical support in said cylindrical cavity in different relative positions and thereby provide for alternatively fastening the tubular guide in different angular positions with respect to said surface of the mounting block.

12. A stair rail spindle jig as defined in claim 11 and further including a separable clamp for interconnecting an assembly of the mounting block, said wood strip, and a stair rail to be drilled.

* * * * *